United States Patent
James (10) Patent No.: US 7,266,633 B2
(45) Date of Patent: Sep. 4, 2007

(54) SYSTEM AND METHOD FOR COMMUNICATING THE SYNCHRONIZATION STATUS OF MEMORY MODULES DURING INITIALIZATION OF THE MEMORY MODULES

(75) Inventor: Ralph James, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/432,018

(22) Filed: May 10, 2006

(65) Prior Publication Data

US 2006/0218331 A1    Sep. 28, 2006

Related U.S. Application Data

(63) Continuation of application No. 10/848,606, filed on May 17, 2004.

(51) Int. Cl.
*G06F 12/00* (2006.01)
(52) U.S. Cl. ............................. 711/5; 711/170; 713/1
(58) Field of Classification Search ............ None
See application file for complete search history.

(56) References Cited

U.S. PATENT DOCUMENTS

| | | | |
|---|---|---|---|
| 4,045,781 A | 8/1977 | Levy et al. | 364/200 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,443,845 A | 4/1984 | Hamilton et al. | 364/200 |
| 4,707,823 A | 11/1987 | Holdren et al. | 370/1 |
| 4,724,520 A | 2/1988 | Athanas et al. | 364/200 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |

(Continued)

FOREIGN PATENT DOCUMENTS

EP    0849685 A2    6/1998

(Continued)

OTHER PUBLICATIONS

Depari, A. et al., "*USB Sensor Network For Industrial Applications*", IEEE XPLORE, May 2004 (Abstract Only).

(Continued)

*Primary Examiner*—Kevin Verbrugge
(74) *Attorney, Agent, or Firm*—Dorsey & Whitney LLP (57) ABSTRACT

A memory system includes a memory hub controller coupled to a plurality of memory modules each of which includes a memory hub. The memory hub controller and the memory hubs each include at least one receiver that is synchronized to an internal clock signal during initialization. The memory hub controller and the memory hubs each transmit an initialization complete signal downstream when at least one receiver in the controller or hub is initialized and, in the case of the memory hubs, when a downstream initialization signal has also been received. Similarly, the memory hubs transmit an initialization signal upstream to another memory hub or the controller when both of its receivers are initialized and an upstream initialization signal has also been received. Receipt of an upstream initialization signal by the memory hub controller signifies that all of the receivers have been initialized.

29 Claims, 5 Drawing Sheets

U.S. PATENT DOCUMENTS

| | | |
|---|---|---|
| 5,243,703 A | 9/1993 | Farmwald et al. .......... 395/325 |
| 5,251,303 A | 10/1993 | Fogg, Jr. et al. ............ 395/275 |
| 5,269,022 A | 12/1993 | Shinjo et al. ................ 395/700 |
| 5,307,381 A | 4/1994 | Ahuja ........................ 375/107 |
| 5,317,752 A | 5/1994 | Jewett et al. ................ 395/750 |
| 5,319,755 A | 6/1994 | Farmwald et al. .......... 395/325 |
| 5,327,553 A | 7/1994 | Jewett et al. ................ 395/575 |
| 5,355,391 A | 10/1994 | Horowitz et al. ............. 375/36 |
| 5,379,382 A | 1/1995 | Work et al. .................. 395/275 |
| 5,432,009 A | 7/1995 | Tabata et al. ................ 395/325 |
| 5,432,823 A | 7/1995 | Gasbarro et al. ............ 375/356 |
| 5,432,907 A | 7/1995 | Picazo, Jr. et al. .......... 395/200 |
| 5,442,770 A | 8/1995 | Barratt ........................ 395/403 |
| 5,461,627 A | 10/1995 | Rypinski .................... 370/95.2 |
| 5,465,229 A | 11/1995 | Bechtolsheim et al. ..... 345/477 |
| 5,479,370 A | 12/1995 | Furuyama et al. ..... 365/189.12 |
| 5,497,476 A | 3/1996 | Oldfield et al. .............. 395/439 |
| 5,502,621 A | 3/1996 | Schumacher et al. ........ 361/760 |
| 5,544,319 A | 8/1996 | Acton et al. ........... 395/200.07 |
| 5,566,325 A | 10/1996 | Bruce, II et al. ............ 395/494 |
| 5,577,220 A | 11/1996 | Combs et al. ................ 395/416 |
| 5,581,767 A | 12/1996 | Katsuki et al. .............. 395/800 |
| 5,606,717 A | 2/1997 | Farmwald et al. .......... 395/856 |
| 5,623,534 A | 4/1997 | Desai et al. .................... 379/59 |
| 5,638,334 A | 6/1997 | Farmwald et al. ..... 365/230.03 |
| 5,659,798 A | 8/1997 | Blumrich et al. ............ 395/846 |
| 5,715,456 A | 2/1998 | Bennett et al. .............. 395/652 |
| 5,729,709 A | 3/1998 | Harness ...................... 395/405 |
| 5,787,475 A | 7/1998 | Pawlowski .................. 711/137 |
| 5,818,844 A | 10/1998 | Singh et al. .................. 370/463 |
| 5,818,984 A | 10/1998 | Ahmad et al. ................ 385/14 |
| 5,819,304 A | 10/1998 | Nilsen et al. .................... 711/5 |
| 5,822,255 A | 10/1998 | Uchida ........................ 365/194 |
| 5,831,467 A | 11/1998 | Leung et al. ................ 327/319 |
| 5,832,250 A | 11/1998 | Whittaker .................... 395/471 |
| 5,875,352 A | 2/1999 | Gentry et al. ................ 395/843 |
| 5,875,454 A | 2/1999 | Craft et al. .................. 711/113 |
| 5,928,343 A | 7/1999 | Farmwald et al. .......... 710/104 |
| 5,966,724 A | 10/1999 | Ryan .......................... 711/105 |
| 5,973,935 A | 10/1999 | Schoenfeld et al. ......... 361/813 |
| 5,973,951 A | 10/1999 | Bechtolsheim et al. ........ 365/52 |
| 5,978,567 A | 11/1999 | Rebane et al. ......... 395/200.49 |
| 5,987,196 A | 11/1999 | Noble .......................... 385/14 |
| 6,023,726 A | 2/2000 | Saksena ...................... 709/219 |
| 6,026,226 A | 2/2000 | Heile et al. ............ 395/500.13 |
| 6,029,250 A | 2/2000 | Keeth .......................... 713/400 |
| 6,033,951 A | 3/2000 | Chao .......................... 438/253 |
| 6,061,263 A | 5/2000 | Boaz et al. .................... 365/51 |
| 6,061,296 A | 5/2000 | Ternullo, Jr. et al. ........ 365/233 |
| 6,067,262 A | 5/2000 | Irrinki et al. ................ 365/201 |
| 6,073,190 A | 6/2000 | Rooney ........................ 710/56 |
| 6,076,139 A | 6/2000 | Welker et al. ................ 711/104 |
| 6,078,451 A | 6/2000 | Ioki ................................ 360/51 |
| 6,079,008 A | 6/2000 | Clery, III .................... 712/11 |
| 6,088,774 A | 7/2000 | Gillingham .................. 711/167 |
| 6,098,158 A | 8/2000 | Lay et al. .................... 711/162 |
| 6,101,151 A | 8/2000 | Watanabe et al. ............ 365/233 |
| 6,105,075 A | 8/2000 | Ghaffari ........................ 710/5 |
| 6,111,757 A | 8/2000 | Dell et al. .................... 361/737 |
| 6,125,431 A | 9/2000 | Kobayashi .................. 711/154 |
| 6,131,149 A | 10/2000 | Lu et al. ...................... 711/167 |
| 6,137,709 A | 10/2000 | Boaz et al. .................... 365/51 |
| 6,144,587 A | 11/2000 | Yoshida .................. 365/189.05 |
| 6,167,465 A | 12/2000 | Parvin et al. .................. 710/22 |
| 6,167,486 A | 12/2000 | Lee et al. .................... 711/120 |
| 6,175,571 B1 | 1/2001 | Haddock et al. ............. 370/423 |
| 6,185,352 B1 | 2/2001 | Hurley ........................ 385/114 |
| 6,186,400 B1 | 2/2001 | Dvorkis et al. ......... 235/462.45 |
| 6,191,663 B1 | 2/2001 | Hannah .................... 333/17.3 |
| 6,201,724 B1 | 3/2001 | Ishizaki et al. ................ 365/49 |
| 6,226,729 B1 | 5/2001 | Stevens et al. .............. 711/171 |
| 6,229,712 B1 | 5/2001 | Munoz-Bustamante et al. . 361/783 |
| 6,229,727 B1 | 5/2001 | Doyle ............................ 365/63 |
| 6,233,376 B1 | 5/2001 | Updegrove .................... 385/14 |
| 6,243,769 B1 | 6/2001 | Rooney ........................ 710/56 |
| 6,243,831 B1 | 6/2001 | Mustafa et al. ................ 714/24 |
| 6,246,618 B1 | 6/2001 | Yamamoto et al. .......... 365/200 |
| 6,247,107 B1 | 6/2001 | Christie ........................ 711/216 |
| 6,249,802 B1 | 6/2001 | Richardson et al. ......... 709/200 |
| 6,256,692 B1 | 7/2001 | Yoda et al. .................. 710/104 |
| 6,266,730 B1 | 7/2001 | Perino et al. ................ 710/126 |
| 6,272,609 B1 | 8/2001 | Jeddeloh .................... 711/169 |
| 6,285,349 B1 | 9/2001 | Smith .......................... 345/147 |
| 6,294,937 B1 | 9/2001 | Crafts et al. ................. 327/158 |
| 6,301,637 B1 | 10/2001 | Krull et al. .................. 711/112 |
| 6,327,642 B1 | 12/2001 | Lee et al. .................... 711/120 |
| 6,330,205 B2 | 12/2001 | Shimizu et al. ..... 365/230.06 |
| 6,344,664 B1 | 2/2002 | Trezza et al. .................. 257/82 |
| 6,347,055 B1 | 2/2002 | Motomura ............. 365/189.05 |
| 6,349,363 B2 | 2/2002 | Cai et al. ...................... 711/129 |
| 6,356,573 B1 | 3/2002 | Jonsson et al. ................ 372/46 |
| 6,367,074 B1 | 4/2002 | Bates et al. .................... 717/11 |
| 6,370,068 B2 | 4/2002 | Rhee .......................... 365/196 |
| 6,373,777 B1 | 4/2002 | Suzuki .................. 365/230.03 |
| 6,381,190 B1 | 4/2002 | Shinkai .................. 365/230.03 |
| 6,392,653 B1 | 5/2002 | Malandain et al. ......... 345/501 |
| 6,401,213 B1 | 6/2002 | Jeddeloh .................... 713/401 |
| 6,405,280 B1 | 6/2002 | Ryan .......................... 711/105 |
| 6,421,744 B1 | 7/2002 | Morrison et al. .............. 710/22 |
| 6,430,696 B1 | 8/2002 | Keeth .......................... 713/503 |
| 6,434,639 B1 | 8/2002 | Haghighi ...................... 710/39 |
| 6,434,654 B1 | 8/2002 | Story et al. .................. 710/307 |
| 6,434,696 B1 | 8/2002 | Kang .............................. 713/2 |
| 6,434,736 B1 | 8/2002 | Schaecher et al. ............ 716/17 |
| 6,438,622 B1 | 8/2002 | Haghighi et al. .............. 710/1 |
| 6,438,668 B1 | 8/2002 | Esfahani et al. ............. 711/165 |
| 6,449,308 B1 | 9/2002 | Knight, Jr. et al. .......... 375/212 |
| 6,453,393 B1 | 9/2002 | Holman et al. ............. 711/154 |
| 6,457,116 B1 | 9/2002 | Mirsky et al. ................ 712/16 |
| 6,462,978 B2 | 10/2002 | Shibata et al. ................. 365/63 |
| 6,463,059 B1 | 10/2002 | Movshovich et al. ....... 370/389 |
| 6,470,422 B2 | 10/2002 | Cai et al. ...................... 711/129 |
| 6,473,828 B1 | 10/2002 | Matsui ........................ 711/104 |
| 6,477,592 B1 | 11/2002 | Chen et al. .................... 710/52 |
| 6,477,614 B1 | 11/2002 | Leddige et al. ................ 711/5 |
| 6,477,621 B1 | 11/2002 | Lee et al. .................... 711/120 |
| 6,479,322 B2 | 11/2002 | Kawata et al. .............. 438/109 |
| 6,490,188 B2 | 12/2002 | Nuxoll et al. .................. 365/63 |
| 6,496,909 B1 | 12/2002 | Schimmel .................... 711/163 |
| 6,501,471 B1 | 12/2002 | Venkataraman et al. .... 345/424 |
| 6,505,287 B2 | 1/2003 | Uematsu .................... 711/170 |
| 6,507,899 B1 | 1/2003 | Wiedholz et al. ........... 711/169 |
| 6,523,092 B1 | 2/2003 | Fanning ...................... 711/134 |
| 6,523,093 B1 | 2/2003 | Bogin et al. ................. 711/137 |
| 6,526,498 B1 | 2/2003 | Mirsky et al. ................ 712/11 |
| 6,539,490 B1 | 3/2003 | Forbes et al. ................ 713/401 |
| 6,552,304 B1 | 4/2003 | Hirose et al. ................ 219/216 |
| 6,552,564 B1 | 4/2003 | Forbes et al. ................ 326/30 |
| 6,553,479 B2 | 4/2003 | Mirsky et al. ................ 712/16 |
| 6,570,429 B1 | 5/2003 | Hellriegel .................... 327/295 |
| 6,584,543 B2 | 6/2003 | Williams et al. ............ 711/105 |
| 6,587,912 B2 | 7/2003 | Leddige et al. ................ 711/5 |
| 6,590,816 B2 | 7/2003 | Perner ........................ 365/200 |
| 6,594,713 B1 | 7/2003 | Fuoco et al. .................. 710/31 |
| 6,594,722 B1 | 7/2003 | Willke, II et al. .......... 710/313 |
| 6,598,154 B1 | 7/2003 | Vaid et al. .................... 712/237 |
| 6,615,325 B2 | 9/2003 | Mailloux et al. ............ 711/154 |
| 6,622,227 B2 | 9/2003 | Zumkehr et al. ............ 711/167 |
| 6,628,294 B1 | 9/2003 | Sadowsky et al. .......... 345/568 |
| 6,629,220 B1 | 9/2003 | Dyer ............................ 711/158 |
| 6,631,440 B2 | 10/2003 | Jenne et al. .................. 711/105 |
| 6,636,110 B1 | 10/2003 | Ooishi et al. ................. 327/565 |
| 6,636,957 B2 | 10/2003 | Stevens et al. .............. 711/171 |

| | | | |
|---|---|---|---|
| 6,643,787 B1 | 11/2003 | Zerbe et al. | 713/400 |
| 6,646,929 B1 | 11/2003 | Moss et al. | 365/194 |
| 6,658,509 B1 | 12/2003 | Bonella et al. | 710/100 |
| 6,661,943 B2 | 12/2003 | Li | 385/18 |
| 6,662,304 B2 | 12/2003 | Keeth et al. | 713/400 |
| 6,667,895 B2 | 12/2003 | Jang et al. | 365/63 |
| 6,681,292 B2 | 1/2004 | Creta et al. | 711/119 |
| 6,697,926 B2 | 2/2004 | Johnson et al. | 711/167 |
| 6,707,726 B2 | 3/2004 | Nishio et al. | 365/189.12 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,113 B2 | 6/2004 | Bhakta et al. | 365/63 |
| 6,751,703 B2 | 6/2004 | Chilton | 711/113 |
| 6,751,722 B2 | 6/2004 | Mirsky et al. | 712/15 |
| 6,752,539 B2 | 6/2004 | Colgan et al. | 385/92 |
| 6,754,117 B2 | 6/2004 | Jeddeloh | 365/201 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,772,261 B1 | 8/2004 | D'Antonio et al. | 710/301 |
| 6,775,747 B2 | 8/2004 | Venkatraman | 711/137 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,931 B2 | 11/2004 | Shih | 710/62 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,950,956 B2 | 9/2005 | Zerbe et al. | 713/400 |
| 6,961,259 B2 | 11/2005 | Lee et al. | 365/63 |
| 6,982,892 B2 | 1/2006 | Lee et al. | 365/63 |
| 7,016,213 B2 | 3/2006 | Reeves et al. | 365/63 |
| 7,024,547 B2 | 4/2006 | Kartoz | 713/1 |
| 7,035,212 B1 | 4/2006 | Mittal et al. | 370/230 |
| 7,047,351 B2 | 5/2006 | Jeddeloh | 711/5 |
| 7,062,595 B2 | 6/2006 | Lindsay et al. | 710/315 |
| 7,102,907 B2 | 9/2006 | Lee et al. | 365/63 |
| 7,106,611 B2 | 9/2006 | Lee et al. | 365/200 |
| 7,106,973 B2 | 9/2006 | Kube et al. | 398/164 |
| 7,120,727 B2 | 10/2006 | Lee et al. | 711/5 |
| 2001/0034839 A1 | 10/2001 | Karjoth et al. | 713/190 |
| 2001/0039612 A1 | 11/2001 | Lee | 713/2 |
| 2002/0038412 A1 | 3/2002 | Nizar et al. | 711/170 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2003/0005223 A1 | 1/2003 | Coulson et al. | 711/118 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0229734 A1 | 12/2003 | Chang et al. | 710/36 |
| 2003/0229770 A1 | 12/2003 | Jeddeloh | 711/213 |
| 2004/0015650 A1 | 1/2004 | Zumkehr et al. | 711/105 |
| 2004/0022094 A1 | 2/2004 | Radhakrishnan et al. | 365/200 |
| 2004/0024959 A1 | 2/2004 | Taylor | 711/105 |
| 2004/0028412 A1 | 2/2004 | Murphy | 398/135 |
| 2004/0044833 A1 | 3/2004 | Ryan | 711/5 |
| 2004/0123088 A1 | 6/2004 | Poisner et al. | 713/1 |
| 2004/0126115 A1 | 7/2004 | Levy et al. | 398/114 |
| 2004/0128421 A1 | 7/2004 | Forbes | 710/303 |
| 2004/0144994 A1 | 7/2004 | Lee et al. | 257/200 |
| 2004/0148482 A1 | 7/2004 | Grundy et al. | 711/167 |
| 2004/0230718 A1 | 11/2004 | Polzin et al. | 710/22 |
| 2004/0251929 A1 | 12/2004 | Pax et al. | 326/30 |
| 2005/0030797 A1 | 2/2005 | Pax et al. | 365/189.12 |
| 2005/0044304 A1 | 2/2005 | James | 711/105 |
| 2005/0091464 A1 | 4/2005 | James | 711/167 |
| 2005/0146946 A1 | 7/2005 | Taylor | 365/189.05 |
| 2005/0162882 A1 | 7/2005 | Reeves et al. | 365/63 |
| 2005/0177690 A1 | 8/2005 | LaBerge | 711/154 |
| 2005/0210216 A1 | 9/2005 | Jobs et al. | 711/170 |
| 2005/0216648 A1 | 9/2005 | Jeddeloh | 710/311 |
| 2005/0228939 A1 | 10/2005 | Janzen | 711/105 |
| 2005/0268060 A1 | 12/2005 | Cronin et al. | 711/167 |
| 2006/0023528 A1 | 2/2006 | Pax et al. | 365/202 |
| 2006/0047891 A1 | 3/2006 | James et al. | 711/105 |
| 2006/0179203 A1 | 8/2006 | Jeddeloh | 710/311 |
| 2006/0179208 A1 | 8/2006 | Jeddeloh | 711/100 |
| 2006/0195647 A1 | 8/2006 | Jeddeloh | 711/100 |
| 2006/0200598 A1 | 9/2006 | Janzen | 710/58 |
| 2006/0204247 A1 | 9/2006 | Murphy | 398/139 |
| 2006/0206667 A1 | 9/2006 | Ryan | 711/115 |
| 2006/0206742 A1 | 9/2006 | James | 713/503 |
| 2006/0271720 A1 | 11/2006 | James et al. | 710/306 |
| 2007/0025133 A1 | 2/2007 | Taylor | 365/63 |
| 2007/0035980 A1 | 2/2007 | Taylor | 365/63 |

FOREIGN PATENT DOCUMENTS

| | | |
|---|---|---|
| JP | 2001265539 A | 9/2001 |
| WO | WO93/19422 | 9/1993 |

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Gillett, R. et al., "*Using The Memory Channel Network*", Micro IEEE, vol. 17, Issue 1, Jan.-Feb. 1997 (Abstract Only).

Gommans et al., "*Applications Drive Secure Lightpath Creation Across Heterogeneous Domains*", Communications Magazine, IEEE, +-vol. 44, Issue 3, Mar. 2006 (Abstract Only).

Hsieh et al., "*On The Design Of A Local Switch For Heterogenous Multi-subsystem Interconnected*", IEEE XPLORE, Oct. 1993 (Abstract Only).

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Gillingham, Peter, "*SLDRAM Architectural and Functional Overview*", 1997 SLDRAM Consortium, Aug. 29, 1997, pp. 1-14.

SYSTEM AND METHOD FOR COMMUNICATING THE SYNCHRONIZATION STATUS OF MEMORY MODULES DURING INITIALIZATION OF THE MEMORY MODULES

CROSS-REFERENCE TO RELATED APPLICATION

This application is a continuation of pending U.S. patent application Ser. No. 10/848,606, filed May 17, 2004.

TECHNICAL FIELD

The present invention relates to a processor-based system, and more particularly, to a processor-based system having a memory module with a memory hub coupling several memory devices to a processor or other memory access device.

BACKGROUND OF THE INVENTION

Processor-based systems, such as computer systems, use memory devices, such as dynamic random access memory ("DRAM") devices, as system memory to store instructions and data that are accessed by a processor. In a typical computer system, the processor communicates with the system memory through a processor bus and a memory controller. The processor issues a memory request, which includes a memory command, such as a read command, and an address designating the location from which data or instructions are to be read or to which data or instructions are to be written. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

Figure 1:
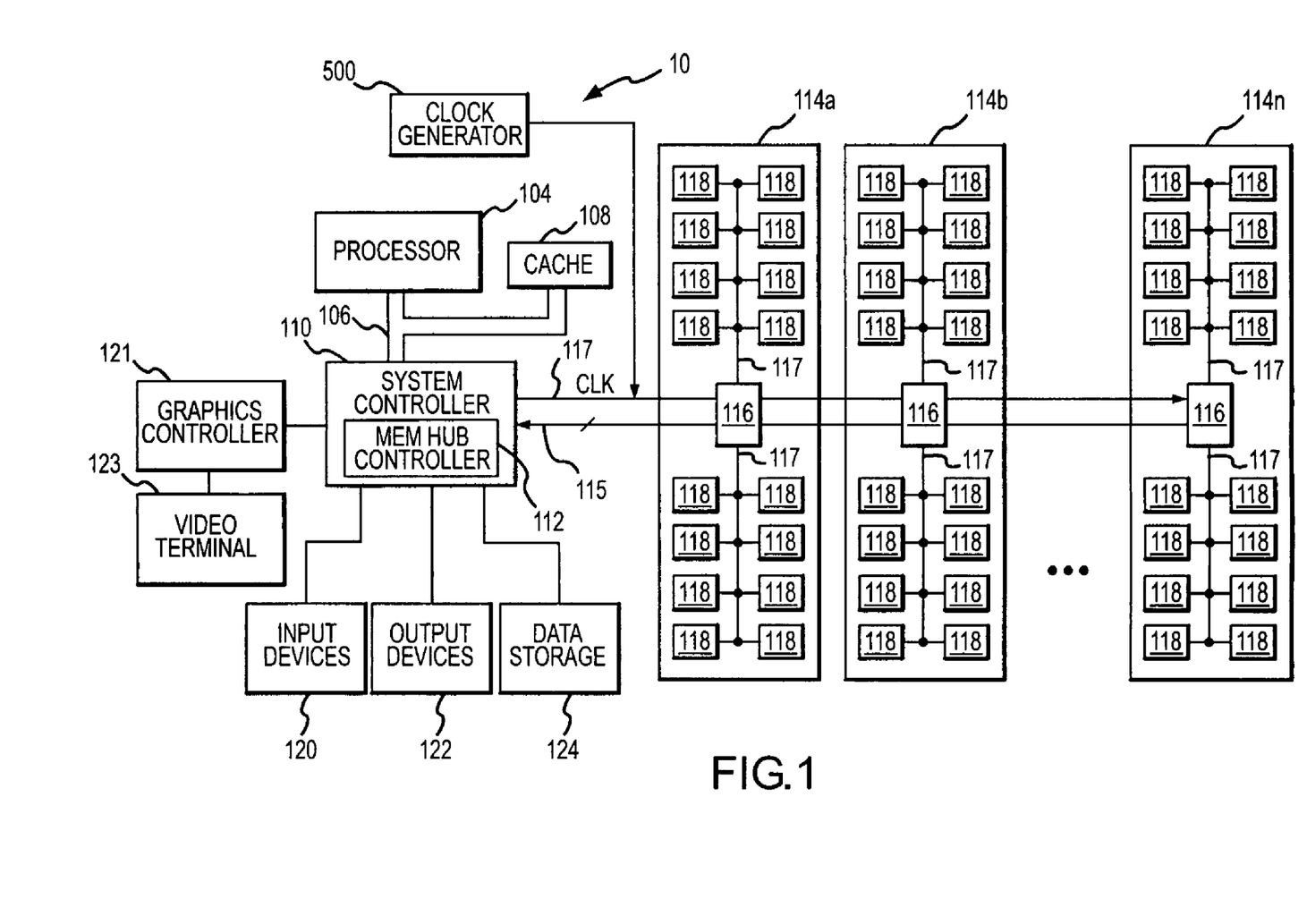
FIG. 1 is a block diagram of a computer system that includes several memory modules having a memory hub architecture coupled to a memory hub controller.

One approach to increasing the data bandwidth to and from memory devices is to use multiple memory devices coupled to the processor through a memory hub as shown in FIG. 1. A computer system 10 using a memory hub architecture includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge.

The system controller 110 contains a memory hub controller 112 that is coupled to the processor 104. The memory hub controller 112 is also coupled to several memory modules 114a–n through a bus system 115. Each of the memory modules 114a–n includes a memory hub 116 coupled to several memory devices 118 through command, address and data buses 117. The memory hub 116 efficiently routes memory requests and responses between the controller 112 and the memory devices 118. Computer systems employing this architecture can have a higher bandwidth because the processor 104 can access one memory module 114a–n while another memory module 114a–n is responding to a prior memory access. For example, the processor 104 can output write data to one of the memory modules 114a–n in the system while another memory module 114a–n in the system is preparing to provide read data to the processor 104. The operating efficiency of computer systems using a memory hub architecture can make it more practical to vastly increase data bandwidth of a memory system. A memory hub architecture can also provide greatly increased memory capacity in computer systems.

The system controller 110 also serves as a communications path to the processor 104 for a variety of other components. More specifically, the system controller 110 includes a graphics port that is typically coupled to a graphics controller 121, which is, in turn, coupled to a video terminal 123. The system controller 110 is also coupled to one or more input devices 120, such as a keyboard or a mouse, to allow an operator to interface with the computer system 10. Typically, the computer system 10 also includes one or more output devices 122, such as a printer, coupled to the processor 104 through the system controller 110. One or more data storage devices 122 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

Although there are advantages to utilizing a memory hub for accessing memory devices, the design of the hub memory system, and more generally, computer systems including such a memory hub architecture, becomes increasingly difficult. The memory modules 114a–n each internally operate synchronously although perations between memory modules are asynchronous. The command, address, and data signals transferred to the memory module 114a–n are normally latched or strobed into the memory modules 114a–n by a clock signal. However, as transfer rates increase, the time during which the command, address and data signals as received at the memory hubs 116 are valid decreases. This period during which the signals are valid is commonly referenced by those ordinarily skilled in the art as the "window" or "eye." Not only does the size of the eye for command, address, and data signals decrease, but the time or location of the eye can also vary because of various factors, such as timing skew, voltage and current drive capability, and the like. In the case of timing skew of signals, it often arises from a variety of timing errors such as loading on the lines of the bus and the physical lengths of such lines.

As the size of signal eyes decrease at higher transfer rates, the variations in the location of the signal eyes become more of a problem. One technique to alleviate this problem to some extent is to couple a clock to the memory modules. As shown in FIG. 1, a clock generator 500 generates a clock signal CLK and couples it to the memory hub controller 112 and each of the memory hubs 116 in respective memory modules 114a–n along with the command, address and data signals that are coupled through the bus system 115. The CLK signal is coupled from the memory hub controller 112 in synchronism with the command, address and data signals so it, in theory, should be usable by the memory hubs 116 to define the eye during for the command, address and data signals as they are received at the memory hubs 116. However, in practice, even this approach becomes ineffective as signal transfer rates continue to decrease. In particular, the CLK signal may be subject to different conditions than the command, address and data signals, such as being coupled through a physically different signal path or being loaded to a greater degree. Also, for the clock forwarding techniques used in the computer system 10 to successfully function at higher clock speeds, the layout of conductors between the memory hub controller 112 and the memory hubs 116 must be precisely controlled.

One technique that has been proposed to allow the CLK signal to continue being used to strobe command, address and data signals at higher transfer rates is to include circuitry (not shown) in the memory hubs 116 that adjusts the timing of the CLK signal within each of the hubs 116 so that it is aligned with the signal eye. However, this technique adds a fair degree of complexity to the memory hubs 116 and is not always effective.

There is therefore a need for a system and method that allows command, address and data signals to be coupled between a memory hub controller and one or more memory hubs in respective memory modules that avoids problems of synchronizing a clock signal coupled between the memory hub controller and memory hubs along with the command, address, and data signals.

SUMMARY OF THE INVENTION

A memory system includes a memory hub controller coupled to a plurality of memory hubs each of which includes at least one receiver that is initialized before use. The memory hub controller transmits a downstream initialization complete signal to one of the memory hubs when initialization of a receiver in the memory hub controller has been completed. Each of the memory hubs determines if it is receiving a respective downstream initialization complete signal, and it also determines if initialization of at least one internal receiver has been completed. If so, each of the memory hubs except for a final memory hub furthest downstream from the memory hub controller transmits a downstream initialization complete signal. If the final memory hub receives the respective downstream initialization complete signal and initialization of at least one receiver in the final memory hub has been completed, the final memory hub transmits an upstream initialization complete signal. Each of the memory hubs except for the final memory hub determines if it is receiving a respective upstream initialization complete signal, and it also determines if initialization of all receivers in the memory hub has been completed. If so, the memory hub transmits an upstream initialization complete signal. When the memory hub controller receives a respective upstream initialization complete signal, it transitions the memory system to normal operation.

DETAILED DESCRIPTION OF THE INVENTION

Embodiments of the present invention are directed to a memory module and memory hub controller each having the capability of generating a clock signal for strobing data signals during the "eye" of the data signals when the data signals are valid. More particularly, embodiments of the present invention are directed to a system and method for communicating the initialization status of the memory module and memory hub controller. Certain details are set forth below to provide a sufficient understanding of various embodiments of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 2:
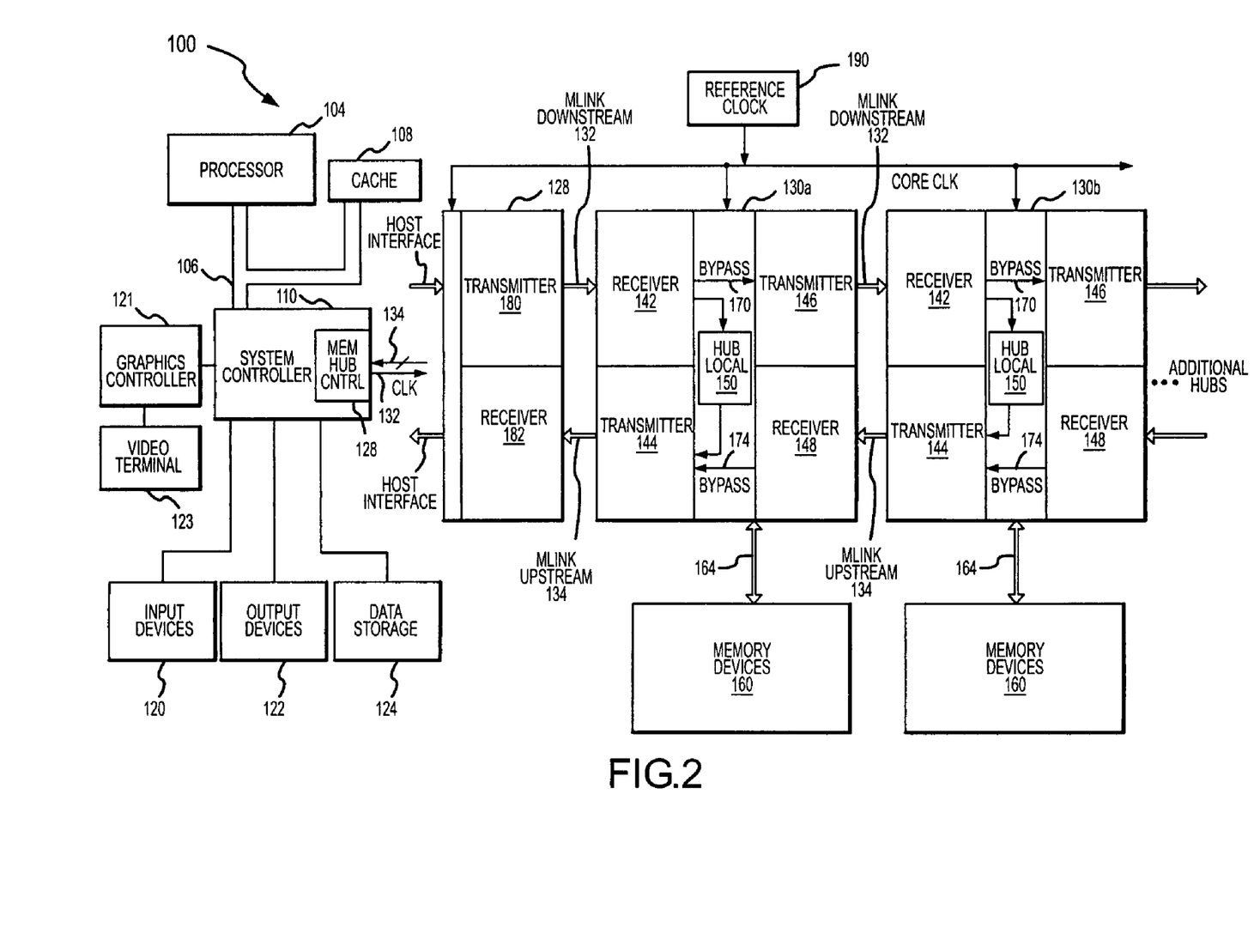
FIG. 2 is a block diagram of a computer system that includes several memory modules having a memory hub architecture according to one embodiment of the present invention.

A computer system 100 having a hub memory system according to one embodiment of the invention is shown in FIG. 2. The computer system 100 uses many of the same components that are used in the computer system 10 of FIG. 1. Therefore, in the interest of brevity, these components have been provided with the same reference numerals, and an explanation of their the functions and operation will not be repeated.

As in the computer system 10 of FIG. 1, the system controller 110 also includes a memory hub controller 128 that is coupled to several memory modules 130a,b . . . n, which serve as system memory for the computer system 100. The memory modules 130 are each coupled to a high-speed downstream bus 132 and a high-speed upstream bus 134. The downstream bus 132 extends downstream from the memory hub controller 128 and both upstream and downstream from each of the memory modules 130 except the memory module 130n furthest from the memory hub controller 128. Similarly, the upstream bus 134 extends upstream from each of the memory modules 130 and downstream from all of the memory modules 130 except the memory module 130n. Each of these buses 132, 134, include a discrete data bus, although they may also include discrete command and address buses, a combined command/address bus, or some other bus system. However, the explanation of the various embodiments will be with respect to a data bus, it being understood that a similar technique can be used to strobe command and address signals.

The downstream buses 132 couple data away from the memory hub controller 128, and the upstream buses 134 couple data toward the memory hub controller 128. Therefore, the downstream bus 132 couples write data to and from each of the memory modules 130, except for the memory module 130n furthest downstream from the memory hub controller 128, which only receives write data. Similarly, the upstream bus 134 couples read data to and from each of the memory modules 130, except for the memory module 130n furthest downstream from the memory hub controller 128, which only transmits read data. The downstream bus 132 also couples write data from the memory hub controller 128, and the upstream bus 134 couples read data to the memory hub controller 128. Significantly, the buses 132, 134 need not couple clock signals to and from the memory modules 130 and the memory hub controller 128 for the purpose of allowing the memory modules 130 to capture data transmitted through the buses 132, 134. Instead, as explained in greater detail below, each of the memory modules 130 and the memory hub controller 128 generates signals internally to strobe the data coupled through the buses 132, 134.

The memory modules 130 are shown coupled to the memory hub controller 128 in a point-to-point coupling arrangement in which each of the buses 132 and 134 are coupled only between two points. However, it will be understood that other topologies may also be used. For example, it may be possible to use a multi-drop arrangement in which a single downstream bus (not shown) and a single upstream bus (not shown) are coupled to all of the memory modules 130. A switching topology may also be used in which the memory hub controller 128 is selectively coupled to each of the memory modules 130 through a switch (not shown). Other topologies that may be used will be apparent to one skilled in the art.

Each of the memory modules 130 includes a first receiver 142 that receives write data through the downstream bus 132, a first transmitter 144 that transmits read data upstream through the upstream bus 134, a second transmitter 146 that transmits write data downstream through the downstream bus 132, and a second receiver 148 that receives read data through the upstream bus 134.

The memory modules 130 also each include a memory hub local 150 that is coupled to its first receiver 142 and its first transmitter 144. The memory hub local 150 receives write data through the downstream bus 132 and the first receiver 142 and couples the write data to one or more of sixteen memory devices 160, which, in the example illustrated in FIG. 2, are synchronous dynamic random access memory ("SDRAM") devices. However, a fewer or greater number of memory devices 160 may be used, and memory devices other than SDRAM devices may also be used. The memory hub local 150 is coupled to each of the memory devices 160 through a bus system 164, which normally includes a control bus, an address bus, and a data bus. However, other bus systems, such as a bus system using a shared command/address bus, may also be used.

The memory hub 150 also receives read data from one or more of the memory devices 160 and couples the read data through the first transmitter 144 and the upstream bus 134. In the event the write data coupled through the downstream bus 132 and the first receiver 142 is not being directed to the memory devices 160 in the memory module 130 receiving the write data, the write data are coupled though a downstream bypass path 170 to the second transmitter 146 for coupling through the downstream bus 132. Similarly, if read data is being transmitted from a downstream memory module 130, the read data is coupled through the upstream bus 134 and the second receiver 148. The read data are then coupled upstream through an upstream bypass path 174, and then through the first transmitter 144 and the upstream bus 134. The second receiver 148 and the second transmitter 146 in the memory module 130*n* furthest downstream from the memory hub controller 128 are not used and may be omitted from the memory module 130*n*.

The memory hub controller 128 also includes a transmitter 180 coupled to the downstream bus 132, and a receiver 182 coupled to the upstream bus 134. The downstream bus 132 from the transmitter 180 and the upstream bus 134 to the receiver 182 are coupled only to the memory module 130*a* that is the furthest upstream to the memory hub controller 128. The transmitter 180 couples write data from the memory hub controller 128, and the receiver 182 couples read data to the memory hub controller 128.

The computer system 100 also includes a reference clock generator 190, which generates a reference clock signal that is coupled to the memory hub controller 128 and each of the memory modules 130. The memory hub controller 128 and the memory modules 130 use the reference clock to generate an internal clock signal that, in the embodiment of FIG. 2, has a frequency of four times the frequency of the reference clock signal. This internal clock signal is used as a transmit clock to strobe data from the transmitters 144, 146, 180. The receivers 142, 148, 182 adjust the phase of the internal clock signal to generate a receive clock signal that is used to strobe data into the receivers 142, 148, 182. Briefly, the receivers 142, 148, 182 perform this function by receiving a known data pattern from a transmitter 144, 146, 180 to which it is coupled, and attempt to capture that data pattern by strobing the data as the phases of the receive clock signals are incrementally varied. The phase of the receive clock signal that best captures the data pattern is then used to strobe data into the receivers 142, 148, 182 in normal operation.

Figure 3:
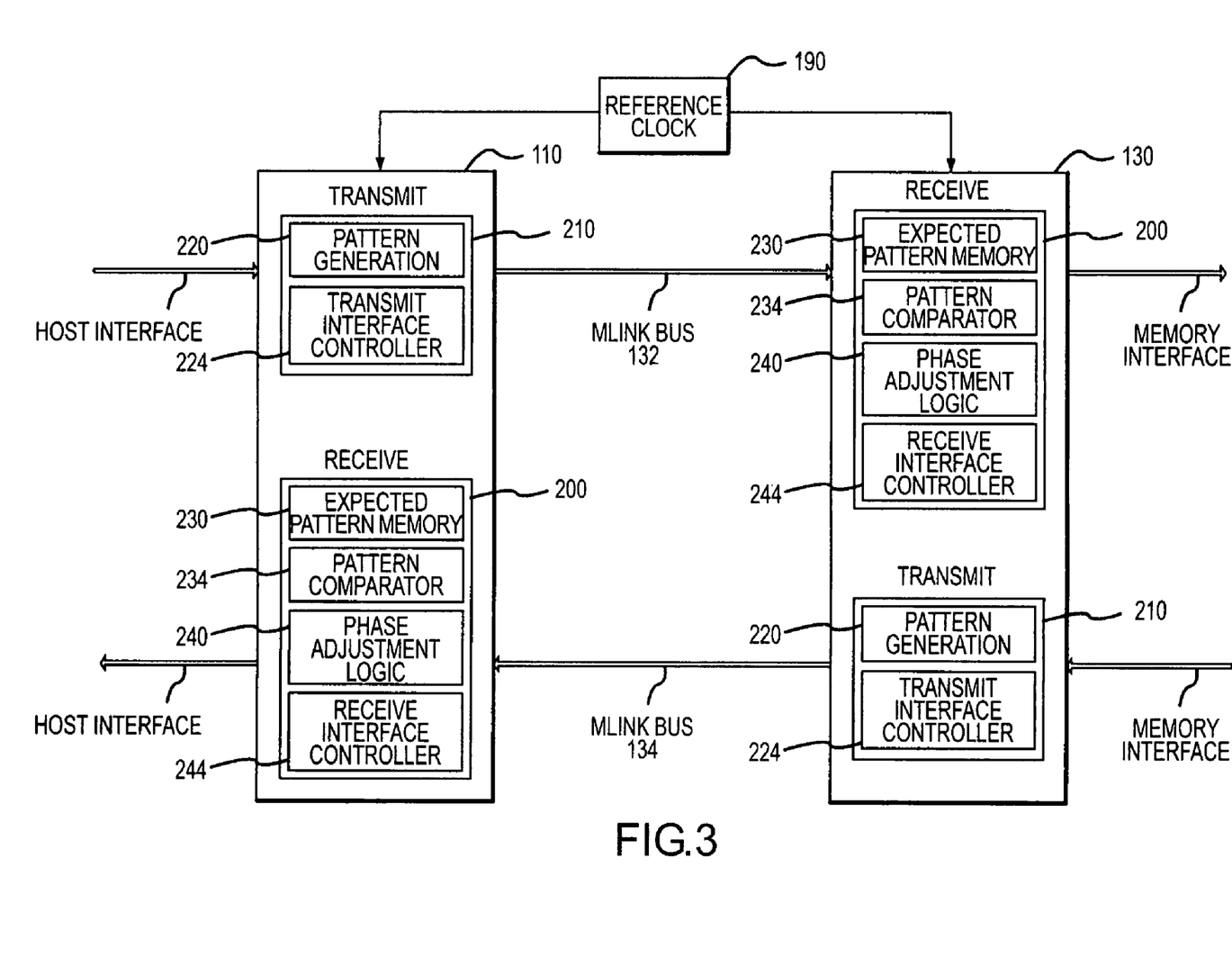
FIG. 3 is a block diagram of one embodiment of receivers and transmitters used in the computer system of FIG. 2 or some other system in accordance with the present invention.

One embodiment of the receivers 142, 182 and the transmitters 144, 180 in the memory hub controller 128 and in one of the memory modules 130 is shown in FIG. 3. In both cases, a receiver 200 functions as both receivers 142, 148 in the memory module 130 and the receiver 182 in the memory hub controller 128, and a transmitter 210 functions as both transmitters 144, 146 in the memory module 130 as well as the single transmitter 180 in the memory hub controller 128. The transmitter 210 includes a pattern generator 220 that generates a predetermined pattern of data bits, and a transmit interface control 224 that controls the transmitting of the pattern. In the embodiment of FIG. 3, the same pattern is transmitted on all of the data bits of the buses 132, 134. During an initialization phase of the receiver 200 and transmitter 210, the transmitter 210 continuously repeats its transmission of the data pattern.

As previously explained, the receiver 200 receives the data bits from the transmitter 210 and strobes them in using a receive clock signal generated from the clock signal received from the clock generator 500 and having four times the frequency of the core clock. More specifically, in one embodiment of the invention, the pattern transmitted by the transmitter 210 is the following 32-bit pattern divided into four cycles each having 8 bits: "01011011 11000101 10010011 00101100" (hex "5BC5932C"). The data bit pattern is transmitted from right to left. In the embodiment of FIG. 3, a bit is strobed into the receiver 200 on each transition of the receive clock signal, so two bits are captured by the receiver 200 on each receive clock cycle. Since the receive clock has a frequency of four times the core clock, eight bits of data are captured during each cycle of the core clock.

In the embodiment of FIG. 3, the first bit is always captured on the positive edge of the receive clock signal. As a result, there are 16 possible patterns of valid data captured by the receiver 200, namely, the transmitted 32-bit pattern shifted by two bits for each pattern. An expected pattern memory 230 stores all 16 of these possible patterns, which, as previously explained, consists of eight bits.

It is significant, for reasons that will be explained below, that the transmitters 210 can transmit the inverse of the above 32-bit pattern, namely "10100100 00111010

01101100 11010011," and the receivers 200 can detect that pattern as well as the fact the inverse of the pattern is being transmitted.

In the embodiment of FIG. 3, a pattern comparator 234 performs three comparisons. First, it checks all of the data bits of the bus 132 to ensure that they all have the same value as each data bit is captured since the same data are transmitted on each data bit of the bus 132. This same comparison is performed on bus 134.

In the second comparison, the pattern comparator 234 compares the eight data bits captured in the receiver 200 for each core cycle to the sixteen valid 8-bit data bit patterns stored in an expected pattern memory 230. For purposes of this comparison, it can use any of the 32 bits captured on each transition of the receive clock signal since the first comparison confirmed that all 32 bits were the same. Based on this comparison, phase adjustment logic 240 adjusts the phase of the receive clock signal so that it can best capture the data coupled to the receiver. More specifically, the pattern comparator 234 compares the 8 bits received during any core cycle to the 16 valid patterns and their inverses stored in the expected pattern memory 230 to adjust the phase of the receive clock signal. The above operation is controlled by a receive interface controller 244. One embodiment of the receivers 200 is shown and described in greater detail, and the operation of the transmitters 210 and receivers are described in greater detail, in U.S. patent application Ser. No. * having a common inventor, which is incorporated herein by reference.

In the third comparison, the pattern comparator 234 checks an additional $33^{rd}$ bit, which functions as a control bit. The pattern that is sent on the beses 132, 134 is also sent on the control bit for each of these buses. The eight bits captured on one core clock is compared in the same manner as the second comparison.

The duration of the initialization process during which the phase of the receive clock signal is adjusted will typically be different for each of the receivers 200 used in the memory modules 130. It is important for the receivers 200 to be able to provide an indication of when the adjustment of the phase of the receive clock signal has been completed for a least two reasons. First, once initialization of a receiver 200 has been completed, the transmitter 210 no longer needs to transmit the 32-bit initialization patterns. By communicating its initialization status, the receiver 200 can inform the transmitter 210 when it can discontinue transmitting the 32-bit pattern.

The second reason why it is important for the receivers 200 to be able to communicate their respective synchronization status is because the computer system 100 (FIG. 2) cannot begin normal operation until initialization of all of the receivers 200 in the memory modules 130 have been completed. Once all of the memory modules 130 have communicated their initialization completion to the memory hub controller 112 (FIG. 2), the memory hub controller 112, and the entire computer system 100, can begin normal operation.

One embodiment of a technique by which the receivers 200 can communicate their respective initialization status will now be explained with reference to the flow chart of FIG. 4. The initialization process is entered at step 300, and the transmitter 180 (FIG. 2) in the memory hub controller 128 begins transmitting test data, i.e., the 32-bit pattern "01011011 11000101 10010011 00101100," at step 304. Each memory module 130 checks at step 310 to determine if its receiver 142 that is coupled to the downstream bus 132 is receiving test data. When the receiver 142 in a memory module begins receiving test data, the transmitter 144 coupled to the upstream bus 134 begins transmitting test data at step 314. Also, the detection of test data on the downstream bus 132 at step 310 causes the transmitter 146 coupled to each downstream bus 132 to begin transmitting test data at step 318. Thus, in a system 100 with multiple memory modules, the transmission of test data by the memory hub controller 128 at step 304 causes each downstream memory module 130 to successively transmit test data both upstream and downstream until both of the transmitters 144, 146 in all of the memory modules 130 are transmitting test data. The receiver 182 in the memory hub controller 128 and the receivers 142, 148 in each of the memory modules 130 then use the test data to adjust the phase of their respective internally generated receive clock signals, as previously explained.

Figure 4:
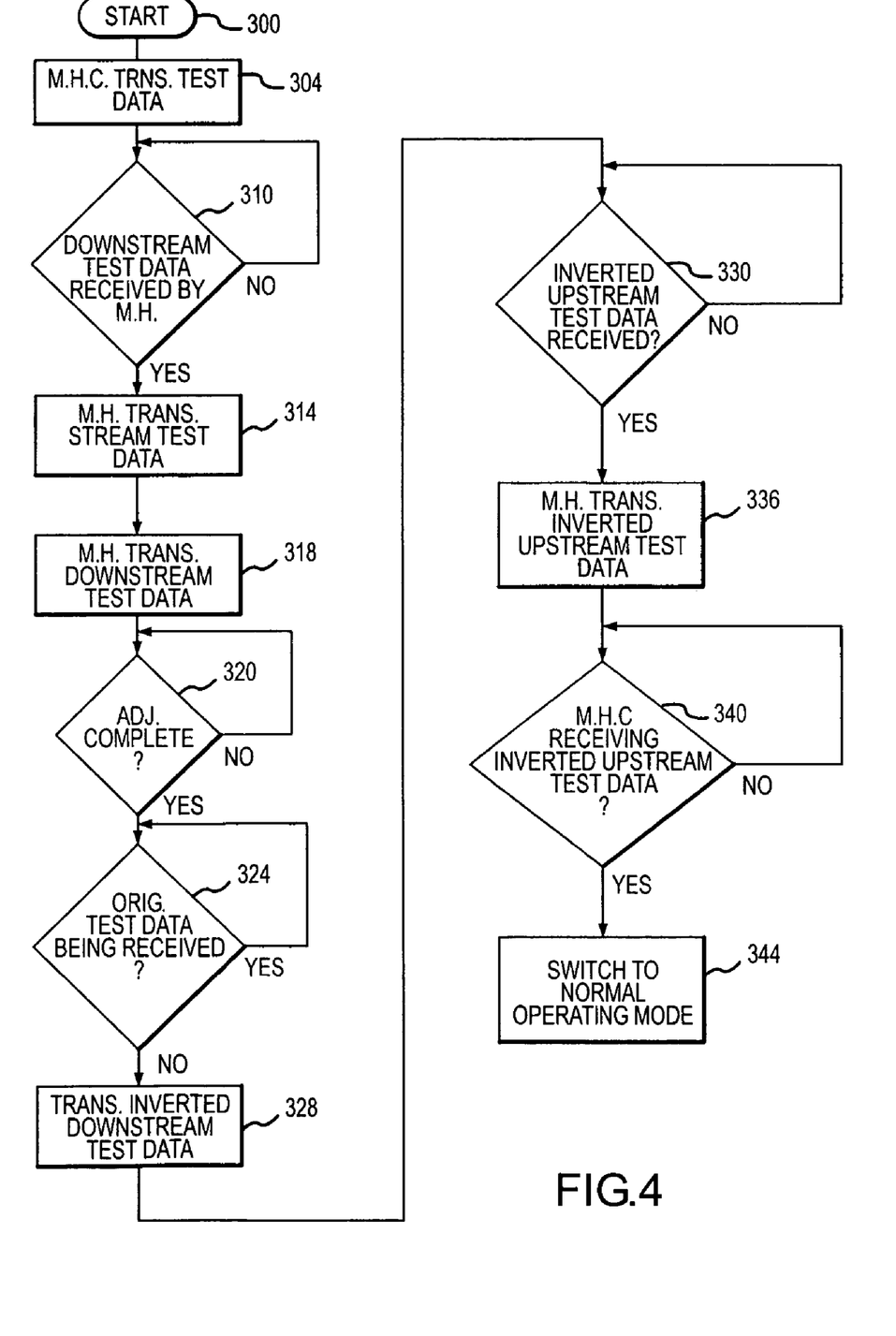
FIG. 4 is a flow chart showing one embodiment of a technique for communicating the synchronization status of each memory module used in the computer system of FIG. 2 during initialization so that a memory hub controller used in the system of FIG. 2 can determine when initialization of all memory modules have been completed.

The procedure shown in FIG. 4 then checks at step 320 to determine when adjustment of the phases of the receive clock signals generated by the receiver 182 in the memory hub controller 128 or the receivers 142, 148 in each memory module 130 has been completed. When phase adjustment completion is detected at step 320, the transmitter 180 in the memory hub controller 128 or the "downstream" transmitter 146 in each memory module 130 checks at step 324 to determine if the original test data (i.e., non-inverted test data) are still being received through the downstream bus 132. If a determination is made at step 324 that the original test data is not being received, the "downstream" transmitter 180 or 132 in the memory hub controller 128 or memory module 130, respectively, inverts the test data it transmits on the downstream bus 132 at step 328.

There is no receiver coupled to the downstream bus 132 for the memory hub controller 128 so the determination at step 324 will always result in the transmitter 180 inverting the test data at step 328 as soon as initialization of the receiver 182 has been completed. However, the "downstream" transmitters 146 in the respective memory modules 130 will not couple inverted test data to the downstream bus 132 at step 328 until detection of initialization completion of both receivers 142, 148 is detected at step 320 and receipt of inverted test data on the downstream bus 132 is detected at step 324. As a result, when the memory hub controller 128 or each of the memory modules 130 transmits inverted test data on the downstream bus 132, it notifies the downstream memory module that initialization has been completed. Each memory module 130 thus transmits inverted data downstream in sequence upon receipt of inverted test data from either the adjacent memory hub controller 128 or the upstream adjacent memory module 130 as long as initialization of both of its receivers have been completed. When the furthest downstream memory module 130 receives inverted test data on the downstream bus 132 at step 324, all of the memory modules 130 have been notified that initialization has been completed for all upstream memory modules and the memory hub controller 128.

Normal operation cannot begin responsive to the furthest downstream memory module 130 receiving inverted test data on the downstream bus 132 because the memory hub controller 128 and the memory modules 130 have not been notified that initialization has been completed for all of the downstream memory modules 130. Therefore, the process checks at step 330 to determine if inverted test data have been received through any upstream data bus 134. The memory module 130 furthest downstream from the memory hub controller 128 has no upstream data bus 134, so the "upstream" transmitter 144 in the furthest downstream memory module begins transmitting inverted test data upstream to the upstream memory module 130 at step 336. In like manner, each "upstream" receiver 148 checks at step 330 to determine if it is receiving inverted test data. If so, the upstream transmitter 144 in the memory module 130 likewise begins transmitting inverted test data upstream at step 336. When the receiver 182 in the memory hub controller 128 detects inverted test data at step 340, it is notified that initialization in both receivers 142, 148 in all of the memory modules 130 have been completed. The memory hub controller 128 then switches to the normal operating mode at step 344 by sending NOP's, or "No Operations" on the downstream bus 132.

In an alternative embodiment, the completion of initialization for only the downstream receiver 142 is checked at step 320 so that the downstream transmitter 146 in each memory module 130 will begin transmitting inverted test data at step 328 as soon as inverted test data is detected on the downstream bus 132 at step 324. In this embodiment, when the furthest downstream memory module detects inverted test data, it only signifies that initialization of the downstream receivers 142 have been completed. However, in this embodiment, the initialization status of the downstream receivers 148 are checked at step 320 along with the determination of whether inverted test data is being received by the "upstream" receiver 148 in the memory module. If inverted test data is being received through the upstream receiver 148 and initialization of the upstream receiver has been completed, the upstream transmitter 144 begins transmitting inverted test data at step 336. Therefore, receipt of inverted test data by the receiver 182 in the memory hub controller 128 still signifies that initialization for both receivers 142, 148 in all of the memory hubs 130 have been completed.

Although the transmission and detected of inverted test data provides one means of communicating the initialization status of the memory hub controller 128 and the memory modules, other communication protocols may alternatively be used.

Figure 5:
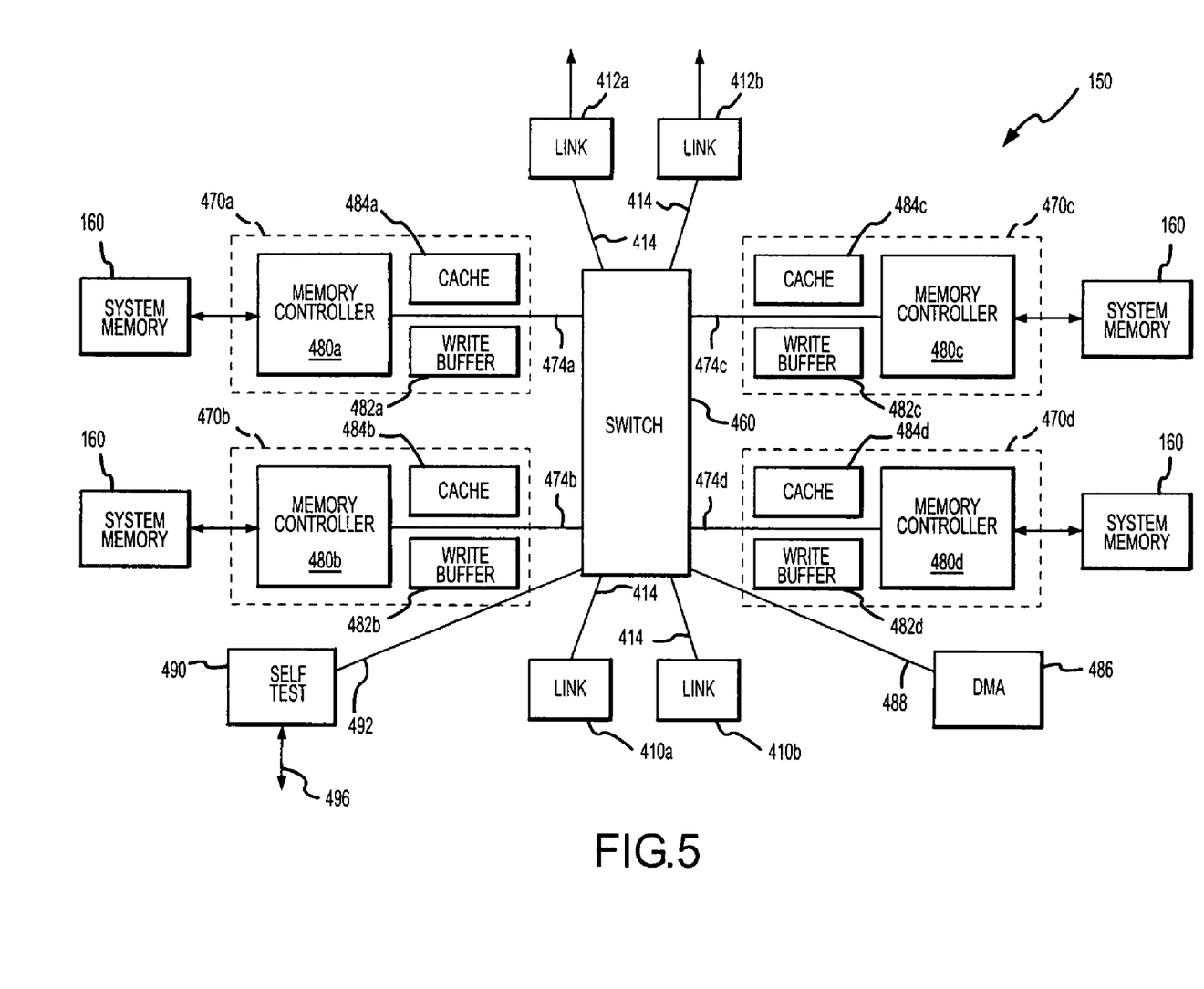
FIG. 5 is a block diagram of a memory hub that may be used the memory modules that are used in the computer system of FIG. 2.

FIG. 5 shows an embodiment of the memory hub local 150 according to the present invention, which can be used in the memory modules 130 of FIG. 2. The memory hub local 150 includes two input bus interfaces 410a,d, which may be used to couple data into the memory hub local 150, and two output bus interfaces 412a,b, which may be used to couple data from the memory hub the memory hub local 150.

The bus interfaces 410a,b, 412a,b are coupled to a switch 460 through a plurality of bus and signal lines, represented by buses 414. The buses 414 are conventional, and include a write data bus and a read data bus, although a single bi-directional data bus may alternatively be provided to couple data in both directions through the bus interfaces 410a,b, 412a,b. It will be appreciated by those ordinarily skilled in the art that the buses 414 are provided by way of example, and that the buses 414 may include fewer or greater signal lines, such as further including a request line and a snoop line, which can be used for maintaining cache coherency.

The switch 460 is coupled to four memory interfaces 470a–d which are, in turn, coupled to the memory devices 160 (FIG. 2). By providing a separate and independent memory interface 470a–d for each set of memory devices 160, the memory hub local 150 avoids bus or memory bank conflicts that typically occur with single channel memory architectures. The switch 460 is coupled to each memory interface through a plurality of bus and signal lines, represented by buses 474. The buses 474 include a write data bus, a read data bus, and a request line. However, it will be understood that a single bidirectional data bus may alternatively be used instead of a separate write data bus and read data bus. Moreover, the buses 474 can include a greater or lesser number of signal lines than those previously described.

In an embodiment of the present invention, each memory interface 470a–d is specially adapted to the memory devices 160 to which it is coupled. More specifically, each memory interface 470a–d is specially adapted to provide and receive the specific signals received and generated, respectively, by the memory devices 160 to which it is coupled. Also, the memory interfaces 470a–d are capable of operating with memory devices 160 operating at different clock frequencies. As a result, the memory interfaces 470a–d isolate the processor 104 from changes that may occur at the interface between the memory hub 130 and memory devices 160 coupled to the memory hub local 150, and it provides a more controlled environment to which the memory devices 160 may interface.

The switch 460 coupling the bus interfaces 410a,b, 412a,b and the memory interfaces 470a–d can be any of a variety of conventional or hereinafter developed switches. For example, the switch 460 may be a cross-bar switch that can simultaneously couple bus interfaces 410a,b, 412a,b to each other to provide the downstream bypass path 170 and the upstream bypass path 174 shown in FIG. 2. The switch 460 can also be a set of multiplexers that do not provide the same level of connectivity as a cross-bar switch but nevertheless can couple the some or all of the bus interfaces 410a,b, 412a,b to each of the memory interfaces 470a–d. The switch 460 may also includes arbitration logic (not shown) to determine which memory accesses should receive priority over other memory accesses. Bus arbitration performing this function is well known to one skilled in the art.

With further reference to FIG. 5, each of the memory interfaces 470a–d includes a respective memory controller 480, a respective write buffer 482, and a respective cache memory unit 484. The memory controller 480 performs the same functions as a conventional memory controller by providing control, address and data signals to the memory devices 160 to which it is coupled and receiving data signals from the memory device 160 to which it is coupled. However, the nature of the signals sent and received by the memory controller 480 will correspond to the nature of the signals that the memory devices re adapted to send and receive. The cache memory unit 484 includes the normal components of a cache memory, including a tag memory, a data memory, a comparator, and the like, as is well known in the art. The memory devices used in the write buffer 482 and the cache memory unit 484 may be either DRAM devices, static random access memory ("SRAM") devices, other types of memory devices, or a combination of all three. Furthermore, any or all of these memory devices as well as the other components used in the cache memory unit 484 may be either embedded or stand-alone devices.

The write buffer 482 in each memory interface 470a–d is used to store write requests while a read request is being serviced. In such a system, the processor 104 can issue a write request to a system memory device 440a–d even if the memory device to which the write request is directed is busy servicing a prior write or read request. The write buffer 482 preferably accumulates several write requests received from the switch 460, which may be interspersed with read requests, and subsequently applies them to each of the memory devices 160 in sequence without any intervening read requests. By pipelining the write requests in this manner, they can be more efficiently processed since delays inherent in read/write turnarounds are avoided. The ability to buffer write requests to allow a read request to be serviced can also greatly reduce memory read latency since read requests can be given first priority regardless of their chronological order.

The use of the cache memory unit 484 in each memory interface 470a–d allows the processor 104 to receive data responsive to a read command directed to a respective system memory device 160 without waiting for the memory device 160 to provide such data in the event that the data was recently read from or written to that memory device 160. The cache memory unit 484 thus reduces the read latency of the system memory devices 440a–d to maximize the memory bandwidth of the computer system. Similarly, the processor 104 can store write data in the cache memory unit 484 and then perform other functions while the memory controller 480 in the same memory interface 470a–d transfers the write data from the cache memory unit 484 to the memory device 160 to which it is coupled.

Further included in the memory hub local 150 may be a self-test module 490 coupled to the switch 460 through a test bus 492. The self-test module 490 is further coupled to a maintenance bus 496, such as a System Management Bus (SMBus) or a maintenance bus according to the Joint Test Action Group (JTAG) and IEEE 1149.1 standards. Both the SMBus and JTAG standards are well known by those ordinarily skilled in the art. Generally, the maintenance bus 496 provides a user access to the self-test module 490 in order to set memory testing parameters and receive test results. For example, the user can couple a separate PC host via the maintenance bus 496 to set the relative timing between signals that are applied to the memory devices 160. Similarly, data indicative of the relative timing between signals that are received from the memory devices 160 can be coupled to the PC host via the maintenance bus 496.

Further included in the memory hub 150 may be a DMA engine 486 coupled to the switch 460 through a bus 488. The DMA engine 486 enables the memory hub 130 to move blocks of data from one location in one of the memory devices 160 to another location in the memory device without intervention from the processor 104. The bus 488 includes a plurality of conventional bus lines and signal lines, such as address, control, data buses, and the like, for handling data transfers in the system memory. Conventional DMA operations well known by those ordinarily skilled in the art can be implemented by the DMA engine 486.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of initializing a memory system having a controller coupled to a plurality of memory hubs each of which includes a respective receiver, each receiver operable to utilize a respective receive clock signal, the method comprising:

receiving predetermined test data at each of the memory hubs;

capturing the predetermined test data at the receiver of each of the memory hubs, and wherein the act of capturing the predetermined test data in a first memory hub of the plurality of memory hubs comprises adjusting a phase of the respective receive clock signal utilized by the receiver in the first memory hub;

transmitting an initialization complete signal from each of the memory hubs responsive to the capture of the predetermined test data in the respective memory hub; and receiving the initialization complete signal at the controller after each of the memory hubs has transmitted the initialization complete signal.

2. The method of claim 1 wherein the predetermined test data comprises a sequence of bits.

3. The method of claim 1 wherein the act of adjusting the phase of the receive clock signal is performed at each of the memory hubs.

4. The method of claim 1 wherein the initialization complete signal comprises a string of bits.

5. The method of claim 1 wherein the initialization complete signal comprises inverted predetermined test data.

6. The method of claim 1 further comprising:

transmitting the predetermined test data from the controller to an initial one of the memory hubs; and transmitting the predetermined test data from the initial one of the memory hubs to a second one of the memory hubs responsive to the first one of the memory hubs capturing the predetermined test data.

7. The method of claim 1 wherein the act of adjusting the phase of the receive clock signal comprises comparing received data to the predetermined test data.

8. The method of claim 1 wherein the act of transmitting the initialization complete signal in a second one of the memory hubs is further responsive to receiving the initialization complete signal from a third one of the memory hubs.

9. The method of claim 8 wherein the second one of the memory hubs transmits the initialization complete signal to the controller.

10. The method of claim 1 further comprising transitioning the memory system to normal operation responsive to receiving the initialization complete signal at the controller.

11. The method of claim 1 wherein each of the respective receive clock signals comprises an internal signal generated by each respective memory hub.

12. A memory module, comprising:

a plurality of memory devices; and a memory hub coupled to the plurality of memory devices, the memory hub comprising:

a receiver operable to receive predetermined test data, the receiver further operable to utilize an internal receive clock signal, the receiver comprising phase adjustment logic operable to adjust a phase of the receive clock signal to capture the predetermined test data; and a transmitter operable to transmit an initialization complete signal responsive to the capture of the predetermined test data.

13. The memory module of claim 12 wherein the memory devices comprise dynamic random access memory devices.

14. The memory module of claim 12 wherein the transmitter is operable to transmit the initialization complete signal further responsive to receipt of the initialization complete signal by the receiver.

15. The memory module of claim 12 wherein the predetermined test data comprises a series of binary values and the initialization complete signal comprises the compliment of the binary values.

16. The memory module of claim 12 wherein the memory hub further comprises a second transmitter operable to transmit the predetermined test data responsive to the receipt of the predetermined test data by the receiver.

17. The memory module of claim 12 wherein the receiver further comprises a pattern comparator coupled to the phase adjustment logic, the pattern comparator operable to compare received data to the predetermined test data.

18. The memory module of claim 12 wherein the memory hub further comprises a second receiver operable to receive the initialization complete signal, the transmitter operable to transmit the initialization complete signal responsive to receipt of the initialization complete signal by the second receiver.

19. A memory system, comprising:
a memory hub controller operable to transmit predetermined test data and receive an initialization complete signal, the memory hub controller further operable to transition the memory system to normal operation responsive to the initialization complete signal; and
a memory module coupled to the memory hub controller, the memory module comprising:
  a plurality of memory devices; and
  a memory hub coupled to the plurality of memory devices, the memory hub comprising:
    a receiver operable to receive the predetermined test data, the receiver further operable to utilize an internal receive clock signal, the receiver comprising phase adjustment logic operable to adjust a phase of the receive clock signal to capture the predetermined test data; and
    a transmitter operable to transmit the initialization complete signal responsive to the capture of the predetermined test data.

20. The memory system of claim 19 wherein the memory devices comprise dynamic random access memory devices.

21. The memory system of claim 19 wherein the transmitter is operable to transmit the initialization complete signal further responsive to receipt of the initialization complete signal by the receiver.

22. The memory system of claim 19 wherein the predetermined test data comprises a series of binary values and the initialization complete signal comprises the compliment of the binary values.

23. The memory system of claim 19 wherein the memory hub further comprises a second transmitter operable to transmit the predetermined test data responsive to the receipt of the predetermined test data by the receiver.

24. The memory system of claim 19 wherein the receiver further comprises a pattern comparator coupled to the phase adjustment logic, the pattern comparator operable to compare received data to the predetermined test data.

25. The memory system of claim 19 wherein the memory hub further comprises a second receiver operable to receive the initialization complete signal, the transmitter operable to transmit the initialization complete signal responsive to receipt of the initialization complete signal by the second receiver.

26. The memory system of claim 19 further comprising a plurality of the memory modules coupled in a chain from the memory hub controller to a terminating memory module.

27. The memory system of claim 26 wherein the terminating memory module is operable to begin transmission of the initialization complete signal on capture of the predetermined test data.

28. The memory system of claim 27 wherein the terminating memory module is operable to couple the initialization complete signal to a next memory module in the chain.

29. The memory system of claim 28 wherein the first memory module is operable to transmit the initialization signal to the memory hub controller.

* * * * *